April 5, 1960 F. T. INNES ET AL 2,931,688

ELECTROGRAPHIC PRINTER

Filed Dec. 30, 1954 2 Sheets-Sheet 1

INVENTOR.
HERMAN EPSTEIN
FRANK T. INNES
ROBERT J. PHELPS

BY Leo Wilder

ATTORNEY

April 5, 1960 F. T. INNES ET AL 2,931,688

ELECTROGRAPHIC PRINTER

Filed Dec. 30, 1954 2 Sheets-Sheet 2

INVENTOR.
HERMAN EPSTEIN
FRANK T. INNES
ROBERT J. PHELPS

BY Leo Wilder

ATTORNEY

United States Patent Office 2,931,688

Patented Apr. 5, 1960

2,931,688

ELECTROGRAPHIC PRINTER

Frank T. Innes, Malvern, Herman Epstein, Suburban Village, and Robert J. Phelps, Philadelphia, Pa., assignors to Burroughs Corporation, Detroit, Mich., a corporation of Michigan Application December 30, 1954, Serial No. 478,602

17 Claims. (Cl. 346—74)

This invention relates to a system of high speed printing, and more particularly to a printing system wherein electrostatic images are impressed upon a dielectric surface.

The operational speed differential between now available relatively slow printing devices and presently existent electronic data processing equipment is such as to make necessary the temporary storage of the informational output of the electronic equipment so as to permit its delivery to the printing device at the operational speed of the latter. This speed differential to a very great extent vitiates the time saving advantages of the electronic equipment since its informational output has little or no utility in its stored state. It is obvious that to utilize the presently available electronic equipment to its fullest potential, it would be extremely desirable to have an associated printer capable of receiving information from such equipment in the form of electrical signals and reproducing it on a recording member in some intelligible manner at a speed compatible with that of the electronic equipment.

In order to decrease or eliminate the above mentioned speed differential, an electrostatic printing system has been developed to replace conventional printing methods employing mechanical pressure between a printing member and a recording medium.

According to the instant technique, a conducting wire or stylus is placed perpendicular to a planar ground electrode with a high resistivity recording medium interposed therebetween. The stylus is connected to a control circuit which is in turn connected to a computer or other suitable electronic equipment. Upon receipt of a signal from the computer, the control circuit transmits a high voltage pulse to the stylus in a manner fully described in patent application Serial No. 443,646, filed by Epstein et al. on July 15, 1954, for an Electrographic Printer. As is made clear in the above identified application, more than one stylus may be used if desired.

According to the above identified application, when a sufficiently high voltage pulse is received by the stylus, a silent, invisible electrical discharge takes place. The process is believed to start when ambient positive ions are attracted to the wire at sufficient energies to cause secondary electron emission. The secondary electrons are strongly accelerated toward the ground electrode and electron avalanches are quickly formed by photoionization and collision processes, leaving behind a cloud of relatively immobile positive ions which, after a short time, so reduce the field gradient that electron emission and avalanche formation cease. Substantially simultaneously with the cessation of electron flow, the voltage pulse applied to the stylus terminates so as to prevent an uncontrolled repetition of the process subsequent to the dissipation of the ion cloud.

The electrons accelerated from the stylus toward the ground electrode during the above mentioned avalanche are captured by the interposed high resistivity recording medium and the negative charges are retained thereby.

Due to induction a positive charge of relatively low intensity is formed about the periphery of the negatively charged area. The charges are made visible at some later time by spraying or otherwise treating the recording medium with an ink or powder which is attracted by the two electric charges of each charged spot on the recording medium. However, due to the relative weakness of the positive charge the powder attached thereto falls away prior to the permanent "fixing" of the spot.

A visible figure is thus formed by the ink deposit. By utilizing a plurality of selectively activated styli in conjunction with a uniformly moving recording medium, it is possible to impress recognizable patterns upon the recording medium at an amazingly high speed.

However, it has been found in practice that certain shortcomings exist in the electrographic printing system outlined above.

Because of handling and the friction between the various elements in the printer and the tape while the machine is in operation, triboelectrically induced charges form on the tape. Such charges attract the ink or powder in the same manner as do the charges deposited upon the tape by the printing head. This results in background discoloration and, in severe cases, obscurement or obliteration of the printed figures. However, it has been found that by discharging the tape immediately prior to its passage beneath the printing head, the background discoloration is drastically reduced if not totally eliminated.

In addition, and because of the irregularity of the space charge and the capricious positioning of the electron avalanches about the fringes of the discharge area, the resultant figures are quite frequently found to have an undesirable lack of uniformity and sharpness. Such lack of uniformity and sharpness leads to the impression of figure patterns which are relatively difficult to read.

It has been discovered that the introduction of an electro-negative gas or vapor into the space charge will drastically reduce the shortcomings of the above described system. Such a gas has a strong tendency to acquire a negative charge in the vicinity of electrical discharges by capturing the slower electrons. A full discussion of the property of "electronegativity" is to be found in the book "The Nature of the Chemical Bond" by Pauling, Cornell University Press, 2nd edition, 1948, p. 58 et seq. As explained at the beginning of section 11*d*, on page 66 of this reference, the property of electro-negativity represents the attraction of a neutral atom in a stable molecule for electrons. Apparently, when such as gas is introduced into an area of space charge, part of it dissociates while the remainder remains in molecular form. Both the molecules and dissociated components acquire a negative charge and drift slowly through the field smoothing out the sharp boundaries of the positive space charge and suppressing the irregularly positioned electron avalanches around the edges of the discharge area. Spreading of the avalanches beyond the limits of the desired discharge path is thus largely prevented, with the observed result that the charged areas on the surface of the recording medium more nearly correspond in form and in extent to the effective discharge areas of the printing styli or electrodes. The negative charge intercepted by the recording medium appears to be an intermixture of negatively charged gas molecules and the charged dissociated components thereof as well as electrons. As in the process described previously, an induced positive charge appears about the periphery of the deposited negative charge. With the use of an electronegative gas, the resultant figures are smaller, sharper and more uniform than those previously obtainable.

It is, accordingly, the primary object of the present invention to provide a high speed electrographic printing system which is capable of impressing uniform and easily readable figure patterns upon a recording medium.

An additional object of the invention is the provision of an electrographic printing head capable of smoothing out the space charge and suppressing the irregularly positioned fringe avalanches incidental to the formation of the figures.

A further object of the invention is the provision of an electrographic printing system which produces printed tape having little or no background discoloration.

Still another object of the invention is the provision of an improved head for the electrographic printer, and more particularly the provision of a head which permits the easy delivery of a fluid into the electrical field produced by the styli contained within the head.

For a greater appreciation of these and other objects of the invention, reference is made to the following specification and accompanying drawing wherein.

Figure 1:
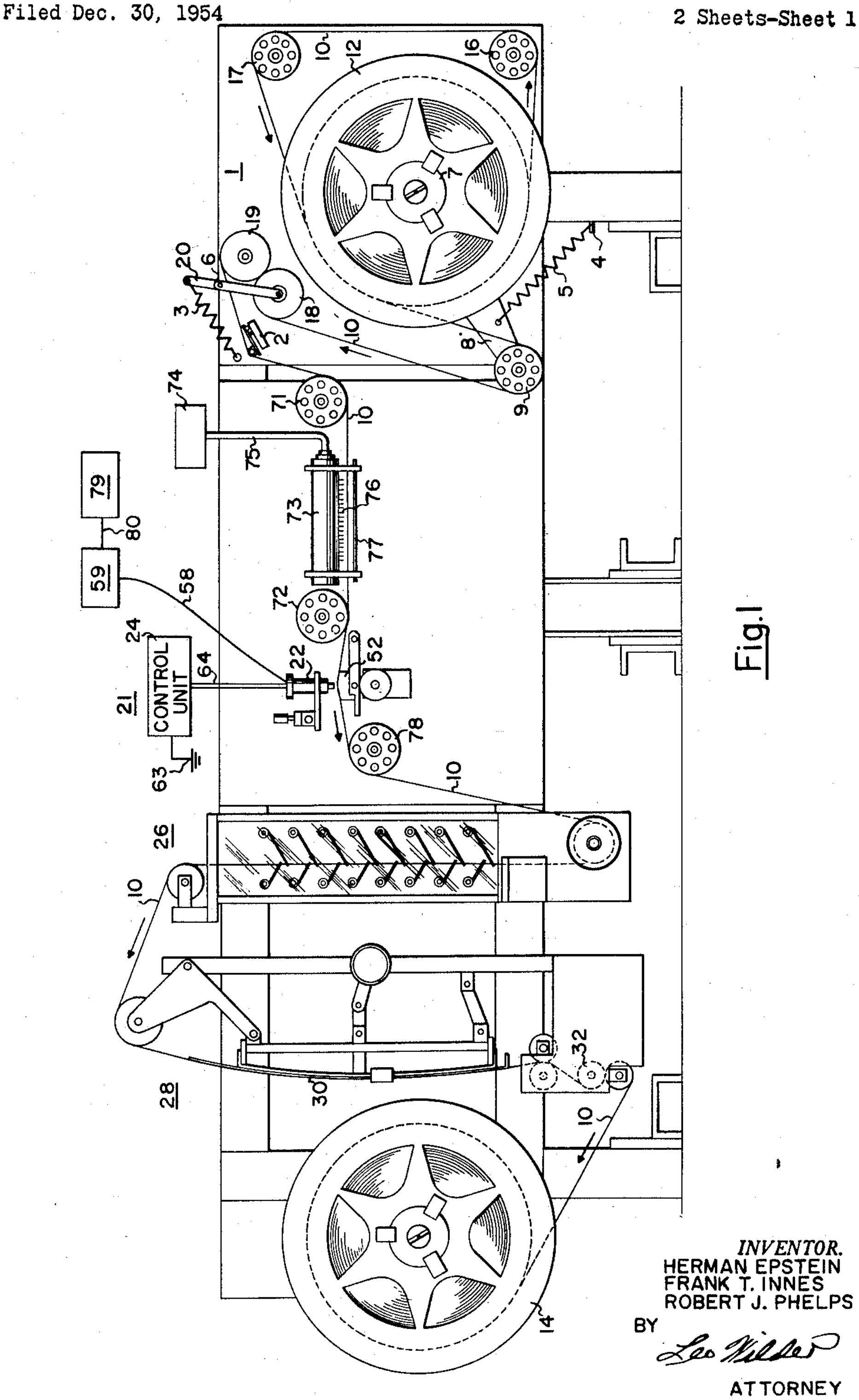
Fig. 1 is a diagrammatic view in side elevation of an electrostatic printing system constructed in accordance with the instant invention.

Referring now more particularly to Fig. 1 of the drawing, numeral 10 designates the recording medium which in this instance is a coating of thermoplastic material such as polyethylene upon the surface of a flexible base such as paper tape. However, other suitable media such as polystyrene, modified ethyl cellulose or acrylic resins may be employed if desired. Alternatively, a recording medium comprising a specially prepared paper which is completely impregnated rather than merely coated with polyethylene or some similar material may be employed if desired. In addition, a recording medium which is not thermoplastic could be used if desired in conjunction with a thermoplastic inking powder. As previously described herein it is the function of the recording medium in the recording process to retain electrostatic charges and the above mentioned materials are examples of high resistivity media suitable for charge retention. The inking powder will be discussed more fully hereinafter.

The recording medium or tape 10 may be initially positioned upon a storage reel 12 so located as to allow the medium to unwind and pass therefrom to the positively driven take-up reel 14 at the opposite end of the printing device by way of the various processing stations. The media or tape 10 is led off the storage reel 12 and passed about idler pulleys 16 and 17 which are mounted on the plate 1 of the machine. The tape is then again passed over an arcuate portion of the storage reel which is employed as an additional bearing point, and then under free wheeling pulley 9 mounted on the outboard end of the sensing arm 8 which, at its inboard end, is connected to hub 7 of the storage reel. Spring 5 having one of its ends anchored to arm 8 and its opposite end fixed to the machine support at 4 tends to rotate the arm in a counterclockwise direction about the axis of storage reel 12. With the tape feeding system operating properly, the tape being under tension urges arm 8 in a clockwise direction, balancing out the counterclockwise force of spring 5. If take up reel 14 is decelerated, with the resultant diminution of the magnitude of the tension in the tape, arm 10 will be caused to rotate in a counterclockwise direction. Such rotation results in the application of a braking force, by means not herein disclosed, to the storage reel 12, causing the latter to decelerate. For a detailed description of the construction and operation of the braking means, resort may be had to patent application Serial No. 447,990, filed August 5, 1954, by Robert R. Tarbuck for a Tape Feeding System, now U.S. Patent No. 2,869,684, dated January 20, 1959. When the tension in the tape again builds up, arm 8 is raised by the tape against the resistance of spring 5 so as to relieve the braking force upon the storage reel.

From pulley 9 the tape is led between spring pressed pulleys 18 and 19, the latter of which may, if desired, be connected to a motor, not shown, and employed as an auxiliary drive for the tape 10. It should be noted that while pulley 19 is mounted for rotation directly on plate 1, pulley 18 rotates about a transverse shaft attached to lever 20, the latter being pivotally connected intermediate its ends to plate 1 at 6. Spring 3 having one of its ends fixed to the plate and its opposite end attached to the outboard extremity of lever 20, urges the latter in a counterclockwise direction so as to compel an intimate engagement between pulleys 18 and 19 and the tape which passes therebetween.

From pulley 19 the tape is led over a microswitch 2 of conventional design which is biased "open," but normally held "closed" by the tension in the tape. In the event that the tape breaks or the slack becomes excessive due to some other cause, the switch is permitted to open, cutting off all power to the machine.

From the switch the tape 10 is led under pulleys 71 and 72 which have their axes of rotation located in substantially the same horizontal plane. Interposed between the pulleys is a static eliminator 73 which is a commercially available item, identified as a "TAKK" Static Eliminator model D and its associated power unit indicated schematically at 74 and connected to the eliminator by cable 75. The eliminator is operable from any standard 110 v., 60 cycle power source and is manufactured by the TAKK Static Eliminator Co. of Newark, Ohio. The arrangement is such that the printing surface of the tape is exposed to a plurality of depending electrodes 76 while a pair of substantially parallel ground electrodes 77 are arranged adjacent to the opposite sides of tape 10. The eliminator is effective to bombard the tape with both positive and negative ions with an intensity suffcient to discharge the tape, but insufficient to cause the ions themselves to be retained on the surface of the tape. This results in the tape being substantially free of any type of electrostatic charge as it passes under the printing head 22.

At the recording station, generally identified by the reference character 21, the tape or recording medium receives an electrostatic latent image from the previously referred to silent, invisible electrical discharges produced in the vicinity of the printing head 22. The details of the printing head will be described in detail hereinafter. The electrical discharges are initiated by controlled voltage pulses derived from the control unit which is diagrammatically represented as a block 24 which is grounded at 63 and connected to the printing head 22 by means of leads 64. The control unit and the phenomena of the electrical discharge are fully described in the above identified application of Epstein et al.

The recording medium 10 impressed with the electrostatic latent image is then driven over roller 78 and through the inking station, generally identified by the reference character 26, wherein it is coated with a suitable ink such as lycopodium powder which has been colored and treated in a manner which is fully disclosed in the aforesaid patent application Serial No. 443,646, or any other ink having the desired electrical and physical requisites necessary to permit its firmly clinging to the latent electrostatic image. The inked recording medium 10 is arranged to then pass vertically upward as is illustrated in Fig. 1 between a series or group of baffle plates wherein it is rapidly vibrated for the purpose of shaking off the excess inking powder clinging to the background or positively charged areas.

The inked recording medium 10 is finally driven through the heat processing station, generally identified by the reference character 28, wherein the image is rendered permanently visible. The recording medium is heat processed by means of the transfer of heat from the surface of a heat conducting metallic plate 30 and is thereby softened. The recording medium then passes between a plurality of calendering rolls, illustrated at 32, which serve to embed the powder in the softened medium. The fixed recording medium 10 continues its travel to the take-up reel 14 where it may be stored for future use.

Figure 4:
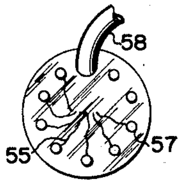
Fig. 4 is a view of the socket end of the head, showing the manner in which the styli are connected to the active pins.
Figure 5:
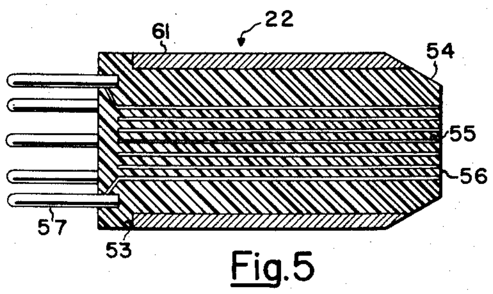

One form of printing head which may be employed in the instant invention is illustrated in Figs. 2, 3, 4, 5 and 6. Herein, the head 22 comprises a substantially cylindrical insulating member 53 having a frusto-conical printing end 54 in order to facilitate the entrance of the electronegative gas into the discharge area immediately below the head. A hollow cylindrical reinforcing jacket 61 which may be metallic or of any other suitable material covers substantially the entire longitudinal surface of head 22 rearwardly of the printing end as is clearly indicated in Figs. 5 and 6. Embedded within the member 53 and running longitudinally thereof as is indicated in Fig. 5 are a plurality of parallelly aligned styli 55 spaced apart by a distance sufficient to insure their insulation with respect to one another at the voltages to which they will normally be subjected. In the instant embodiment the styli consist of tungsten wires having diameters of approximately $\frac{3}{1000}''$ which are parallel and aligned in a plane passing through the longitudinal axis of the printing head, while the insulating member is composed of Hysol 6080 casting resin manufactured by the Houghton Laboratories Inc. of Olean, N.Y. However, it should be understood that the styli may be composed of any suitable conducting material and is not necessarily limited to tungsten of the dimension noted above. It is equally true that other suitable materials may be used for the insulation in place of Hysol 6080. It was found that a spacing of twenty mils between centers was sufficient to insure complete insulation of the styli in the instant case, but this figure being a function of both the applied voltage and the dielectric strength of the insulating material as well as the length of the air gap between the styli at the printing end of the head will accordingly vary if changes are made in any of these determinants.

At one end the styli 55 terminate substantially flush with the flat transverse surface 56 of the printing end of the head 22. At their opposite ends the styli are stretched substantially radially into a sunburst configuration and connected to the pins 57 just below the surface of the Hysol 6080 as is best illustrated in Figs. 4 and 5. In the present embodiment the head has nine pins so as to make possible its employment with a nine hole socket. Since only seven styli are employed, two of the pins are dummies as is indicated in Fig. 4. It is obvious, of course, that a greater or lesser number of pins and styli may be employed if desired without in any way departing from the scope or spirit of the present invention.

Figure 7:
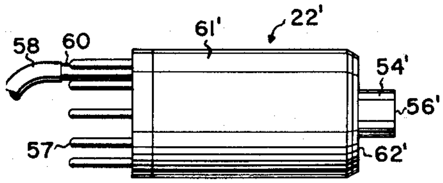
Figs. 7 and 8 are side and printing end views respectively of a modified form of printing head.
Figure 8:
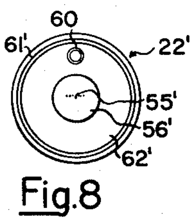
Figure 6:
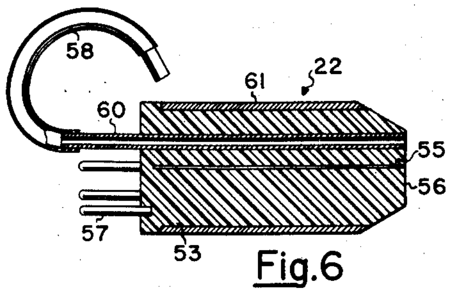
Figs. 5 and 6 are sectional views of the head illustrated in Figs. 2 and 3, taken on lines V—V and VI—VI thereof respectively.

Parallel to the plane containing the styli, but off-set therefrom is a gas delivery tube 60, one of whose ends terminates substantially flush with the surface 56 of the printing end of head 22 while its opposite end extends a short distance beyond the socket end of the head as is shown in Fig. 6. A flexible conduit 58 connects the tube to a gas reservoir 59. Another form of printing head is illustrated in Figs. 7 and 8. Herein the printing end of head 22' is turned down or reduced so as to form an integral cylindrical boss 54' which terminates in a substantially planar shoulder 62'. This configuration is employed to further facilitate the entrance of the gas into the area immediately below head 22'.

Figure 9:
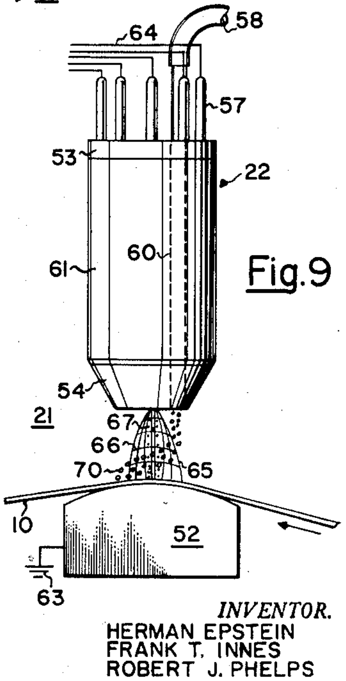
Figure 9 is an enlarged view of the recording station in the system of Fig. 1, showing the printing head and ground electrode spaced apart by an exaggerated distance so as to clearly show the intermixture between the electrical discharge and the electronegative gas.

Referring now more particularly to Fig. 9, which is an enlarged view of the printing station 21, as well as to Fig. 1, it may be seen that electrode 52 is grounded at 63. The printing head 22 which is normally located approximately $\frac{2}{1000}''$ from the upper surface of the recording medium is illustrated herein as being spaced an exaggerated distance from said medium in order to more clearly illustrate the action of the electro-negative gas upon the electrical discharge and the resultant figure formation.

Pins 57 of the head are connected to the control unit 24 in a conventional manner, herein indicated diagrammatically by leads 64, while the gas delivery tube 60 is connected to gas reservoir 59 of a conventional type by means of flexible conduit 58. When a voltage is applied to the styli, an electric field indicated by the lines of force 65 and equipotential lines 66 is set up between the styli and grounded electrode 52. A constantly applied voltage of this nature, itself of insufficient magnitude to make a record, serves as a biasing voltage. Subsequently, if a voltage pulse of a sufficiently high magnitude and in the proper direction is applied to the styli in a manner such as that described in the above identified application of Epstein et al., an electrical discharge indicated by the cloud 67 and of a nature described hereinbefore will occur. It may be pointed out here that the printing discharge occurs between an electrode having an extremely limited discharge area and one substantially unlimited in area, relative thereto. As is known, such a configuration of electrodes is favorable to the production of a silent discharge at a potential difference well below that at which arcing or sparking takes place. In accordance with the description in said application a negative charge will be captured by the high resistivity recording medium 10 which, while the machine is in operation, moves constantly from right to left between the electrodes as indicated by the arrow and a latent electrostatic image will be formed. However, the discharge is quite frequently of an irregular shape having capriciously positioned fringe avalanches of electrons which cause a lack of uniformity in the resultant figures. It was found that the introduction of an electro-negative gas 70, the best known of which are the gaseous halogens and halogen compounds, into the space charge results in the formation of latent electrostatic figures or images which are smaller, more uniform and clearer than those formed in the absence of the gas. It is thought that when introduced into the electric field, part of the gas remains in molecular form while the remainder dissociates. Both the molecules and dissociated components of the electro-negative gas acquire a negative charge and suppress the fringe avalanches. In addition, the electro-negative gas tends to hinder the start and accelerate the termination of the discharge. As was stated previously, the resultant charge deposited upon the recording medium appears to be an intermixture of negatively charged gas molecules and the charged dissociated components thereof as well as electrons.

In the embodiment of the invention illustrated in Fig. 9 a continuous flow of air is bubbled by a conventional pump or compressor 79 via conduit 80 through trichlorethylene held by the reservoir 59 and injected via conduit 58 and tube 60 into the area between the styli and the recording medium at a flow rate which is dependent upon the printing speed. A flow rate of 200 cc./min. at a printing speed of 300 characters per second has been found to give excellent results. However, other gases of the class mentioned above, such as carbon tetrachloride vapor which dissociates into $CCl_3$ and Cl, both highly electro-negative, may be used if desired and at a flow rate which gives best results at the particular operating conditions involved. As used herein the term "gas" includes vapors derived from liquids.

Figure 10:
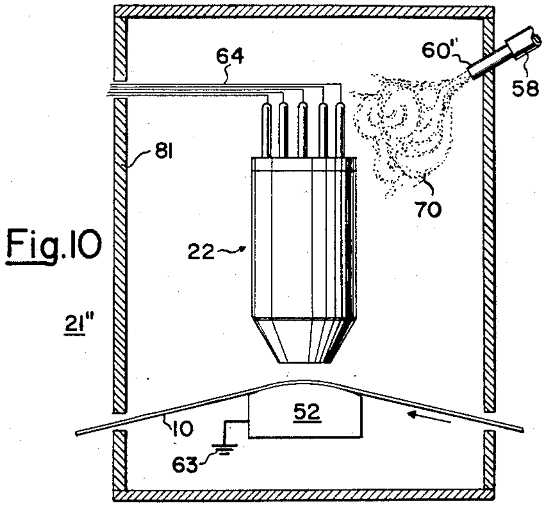
Fig. 10 is a view similar to Fig. 9, but modified by having the entire printing station enclosed in a gas filled chamber.
Figure 2:
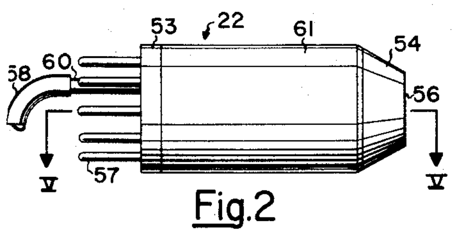
Fig. 2 illustrates in side elevation a printing head of exemplary geometric configuration which may be incorporated in the printing system of Fig. 1.
Figure 3:
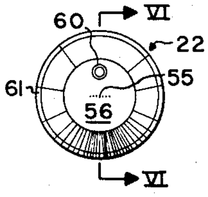
Fig. 3 is a view of the printing end of the head illustrated in Fig. 2.

It may be noted that the gas 70 which is ejected from tube 60 on the leading side of the printing head 22 is aided in its movement into the area between the electrodes by the action of the moving recording medium 10. An alternative way of introducing the gas 70 into the desired area is illustrated in Fig. 10. As is shown therein, the printing station 21" is enclosed in a chamber 81 having a gas delivery tube 60" mounted in its side. In this manner, the entire atmosphere in the immediate vicinity of the printing head 22 is permeated with the electro-negative gas. This substantially equal distribution of the gas results in better penetration by it into the discharge area, causing increased uniformity and clarity in the printing.

It may, therefore, be seen that by utilizing the present invention and electrically discharging the tape prior to recording and by injecting an electro-negative gas into the space charge between two electrodes, electrostatic images of uniform size may be combined into easily readable patterns upon an interposed high resistivity recording medium. The results achieved in this manner compare favorably with those obtained through the utilization of conventional printing techniques and at a speed of reproduction far in excess of that obtainable by any other known method.

What is claimed is:

1. Apparatus for electrically recording signals comprising a pair of spaced apart electrodes, a recording medium interposed between said electrodes having a high electrical resistivity, means for applying a biasing voltage between said electrodes ineffective to produce a discharge therebetween, a source of voltage pulses of predetermined amplitude, means for applying pulses from said source between said electrodes in additive relation to said biasing voltage, the combination of said biasing voltage and one of said pulses causing a silent, invisible electrical discharge between the electrodes and thereby electrostatically charging the interposed medium over a limited area thereof, a source of an electronegative gas, and means for introducing gas from said source into the space in which said discharge occurs to control fringe electron avalanches in the discharge and thereby control the extent of said charged area.

2. Apparatus for electrically recording signals comprising a head containing a plurality of electrically conductive styli, means for insulating said styli one from the other, a common electrode spaced from said styli, a recording medium having a high electrical resistivity interposed between said conductive styli and said common electrode, means including a conduit at least partially contained within and supported by the said head for introducing an electronegative gas into the space between the said conductive styli and the said common electrode, and means connected to the said conductive styli for delivering thereto electric stimuli of amplitude sufficient to cause through the said electronegative gas between selected ones of said conductive styli and the said common electrode electric discharges adapted to cause the formation of discrete latent electrostatic images on the said recording medium.

3. Apparatus for electrically recording signals comprising a recording head containing a plurality of electrically conductive styli in parallel mutually insulated relation, a common electrode equidistantly spaced from corresponding termini of said styli, a charge-retentive medium interposed between the styli and common electrode, means for delivering to the styli electrical stimuli effective to cause silent invisible electrical discharges between selected ones of the styli and the common electrode and thereby electrostatically charge the interposed medium over limited areas thereof adjacent the selected styli, a chamber surrounding said head and common electrode, a source of an electronegative gas, and means for introducing gas from said source into said chamber to control fringe electron avalanches in the discharges and thereby control the form of said charged areas.

4. Apparatus for electrically recording signals comprising a recording head containing a plurality of electrically conductive mutually insulated styli having aligned termini, a common electrode spaced from said termini, means defining a path for the transport of a charge-retentive recording medium causing the medium to pass between the styli and common electrode, means positioned along said path for electrically discharging a medium transported thereover prior to passage between the styli and common electrode, means for delivering to the conductive styli electric stimuli effective to cause silent invisible electrical discharges between the styli and said common electrode, and means for introducing an electronegative gas into the space between the aligned termini of the styli and the common electrode to suppress fringe electron avalanches in the discharges and thereby prevent spreading of the discharges laterally of the principal axes thereof.

5. Apparatus for electrically recording signals comprising a pair of electrodes spaced apart at their discharge surfaces by an air gap, a high resistivity charge-retentive recording medium, means for advancing the medium through said gap transversely of the direction of spacing of the electrodes, means operative to electrically discharge the medium prior to passage thereof through said gap, means for applying electrical stimuli to at least one of said electrodes effective to cause silent invisible electrical discharges between the electrodes and thereby electrostatically charge a limited area of the portion of said medium positioned in said gap, a source of a strongly electronegative gas, and means for introducing gas from said source into the space between the discharge surfaces of said electrodes.

6. Apparatus for electrically recording signals comprising a pair of aligned electrodes spaced apart by an air gap; a printing head containing at least one of said electrodes; means for advancing a recording medium having a high electrical resistivity through the air gap substantially transversely to the alignment of the said electrodes; means for electrically discharging the recording medium prior to its passage through the said air gap; means for applying to at least one of the said electrodes, so as to set up an electric field between the said electrodes, a biasing voltage at a predetermined level below the magnitude necessary to cause an electrical discharge; means including a conduit at least partially contained within and supported by the said printing head for introducing an electronegative gas into the said electric field between the said electrodes; and means for applying to at least one of the said electrodes a voltage pulse of predetermined amplitude sufficient, in combination with the said bias voltage, to cause an electric discharge between the said electrodes and form on the said interposed recording medium a latent electrostatic image.

7. Apparatus for electrically recording signals comprising a pair of electrodes having discharge surfaces spaced by an air gap, a high resistivity charge-retentive recording medium, means for advancing the medium through said gap transversely of the direction of spacing of the electrodes, means operative to electrically discharge the medium prior to passage thereof through said gap, means for applying to at least one of said electrodes a biasing voltage of predetermined magnitude insufficient to cause a discharge between the electrodes, a source of voltage pulses of predetermined amplitude, means for applying said pulses to one of said electrodes in suitable relation to said biasing voltage to increase the total voltage acting between the pair of electrodes to a value causing silent invisible electrical discharges to occur between the electrodes, a source of a strongly electronegative gas, and means for introducing gas from said source into the space in which said discharges occur, said last means including a chamber surrounding the electrodes and conduit means connecting said chamber and said source.

8. Apparatus for electrically recording signals comprising a head containing a plurality of electrically conductive styli in mutually insulated relation and having aligned termini, a common electrode spaced from said termini of the electrodes, a high resistivity charge-retentive recording medium interposed between said aligned termini and the common electrode, means for advancing the medium therebetween, means in electrical connection with said styli for delivering thereto electrical stimuli causing silent invisible electrical discharges between selected ones of the styli and the common electrode and thereby electrostatically charging discrete areas of the interposed medium respectively included in the paths of the discharges, means at least partially isolating a portion of the space between the conductive styli and the recording medium from the atmosphere external thereto, a source of an electronegative gas, and means for introducing gas from said source into said isolated space portion to suppress fringe electron avalanches in the discharges.

9. Apparatus for electrically recording signals by transporting a high resistivity recording medium past a voltage energized recording station comprising a head containing a plurality of electrically conductive styli insulated one from another, a common electrode spaced from said styli, means for transporting the said medium past the said head in the space between the said styli and the said common electrode and in spaced relationship to the said styli, means for selectively electrically energizing the said styli to produce silent invisible discharges between the selected styli and the common electrode, a source of an electronegative gas, and means for introducing gas from the said source into the atmosphere existing between the said styli and the recording medium to condition the said discharges.

10. In electrostatic printing apparatus comprising spaced electrodes, means for moving between said electrodes a recording medium adapted to receive charges in selected areas of the surface thereof, means for applying between said electrodes a potential difference sufficient to produce a non-arcing discharge between said electrodes, and means for connecting said electrodes to a source of signals and operable for controlling the application of said potential difference in accordance with said signals, the improvement which consists in means for providing in the space adjacent to said electrodes an atmosphere which includes an electronegative gas as a component of said atmosphere.

11. In apparatus for recording information by applying electric charges to areas of surfaces of high-resistivity, a recording station comprising a pair of electrodes having opposed discharge surfaces spaced by an air gap, means for creating a difference of electrical potential therebetween sufficient to cause a non-arcing discharge in which free electrons are present, means for supplying to the said air gap a strongly electronegative gas, and means for supporting a record medium having a surface of high resistivity in sufficiently close proximity to said air gap to have the surface thereof charged by the discharge between the electrodes.

12. In apparatus for electrostatically producing a record on a high resistivity recording medium the combination of a head containing a plurality of electrically conductive styli insulated one from another, an electrode opposed to and spaced from said styli to define a gap between the electrode and the styli for the introduction of the recording medium therebetween, means for electrically exciting selected ones of said styli to induce silent invisible discharges therefrom to the opposed electrode, a source of electronegative gas, and means for introducing said gas into the atmosphere surrounding said styli to condition electrical discharges resulting from excitation of the styli.

13. The combination defined in claim 12 wherein said styli terminate at corresponding discharge ends thereof at a plane boundary surface of said head.

14. The combination defined in claim 12 wherein the means for introducing said gas includes a conduit communicating with said source and having an outlet in the vicinity of said styli.

15. In electrostatic printing apparatus wherein charged areas defining indicia are produced on a charge-retentive surface of a recording medium by causing non-arcing electrical discharges to occur from electrodes having the respective discharge surfaces thereof closely spaced from said surface of the medium, the combination of an electrode comprising a discharge surface principally controlling the form and extent of a charged area thus produced, means providing an insulating mounting for said electrode, means providing a connection for electrically charging said electrode to a potential effective to cause a non-arcing discharge therefrom, a source of a strongly electronegative gas, and means for introducing said gas into the atmosphere in which a discharge from said electrode occurs.

16. In electrostatic printing apparatus wherein charged areas defining indicia later to be made visible are produced on a charge-retentive surface of a recording medium causing electrical discharges involving ionization of the discharge atmosphere to occur between electrodes suitably positioned relative thereto, the combination of a pair of electrodes having opposed surfaces spaced one from the other to form a discharge gap into which said medium can be introduced, means for inducing a non-arcing electrical discharge between said electrodes and across said gap, thereby to charge areas of said surface of the medium when the medium is positioned within the gap, a source of electronegative gas, and means for introducing said gas into the atmosphere in which an electrical discharge caused by said discharge inducing means occurs, thereby to control the ionized condition of said atmosphere.

17. The combination defined in claim 16 wherein one electrode of said pair has a gap-bounding surface which is greatly restricted in area relative to the more extensive area of the gap-bounding surface of the other electrode.

References Cited in the file of this patent

UNITED STATES PATENTS

| | | |
|---|---|---|
| 2,143,376 | Hansell | Jan. 10, 1939 |
| 2,197,050 | Kellogg | Apr. 16, 1940 |
| 2,200,741 | Gray | May 14, 1940 |
| 2,302,289 | Bränston-Cook | Nov. 17, 1942 |
| 2,486,985 | Ruderfer | Nov. 1, 1949 |
| 2,771,336 | MacGriff | Nov. 20, 1956 |

OTHER REFERENCES

Physical Review, 2nd series, vol. 56, 1939, July-December, by H. C. Pollock, F. S. Cooper, pages 170–175.

Dielectric Materials and Application by Von Hipple, pub. jointly by the Technological Press of M.I.T. and John Wiley and Sons, Inc. New York, copyright 1954, pages 149–152.